(12) United States Patent
Andersen

(10) Patent No.: US 6,226,657 B1
(45) Date of Patent: *May 1, 2001

(54) METHOD AND APPARATUS FOR GENERATING A REMOTE PRINTABLE REPORT

(75) Inventor: Todd W. Andersen, Meridian, ID (US)

(73) Assignee: Micron Electronics, Inc., Nampa, ID (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,938

(22) Filed: Oct. 15, 1997

(51) Int. Cl.[7] ..................................................... G06F 15/00
(52) U.S. Cl. .......................................... 707/513; 358/1.15
(58) Field of Search ..................... 707/513, 500, 707/526; 358/1.15, 1.16, 1.13; 709/217–219

(56) References Cited

U.S. PATENT DOCUMENTS 5,669,000 * 9/1997 Jessen et al. .......................... 395/704
5,781,914 * 7/1998 Stork et al. ........................... 707/506
5,848,261 * 12/1998 Farry et al. ........................... 395/500

OTHER PUBLICATIONS

Robbins, J., Mastering DOS, 2nd Ed., Sybex, pp. 325–327, 1988.*
Sobell, UNIX System V: A Practical Guide, 3rd Ed, Addison–Wesley, pp. 4, 92, 98, 176, 1995.*
Holzner, JavaScript Complete, McGraw–Hill, p. 409, 1998.*
Deitel, C How to Program, 2nd Ed, Prentice–Hall, pp. 536–537, 1994.*
"Microsoft MS–DOS User's Guide", Version 3.3, p. 18, 1987.*
"Virtual URL" (URL http://www.virtualurl.com, 1999.*
Internet Exchange dtd Jul. 9, 1996 between W. Hester and J.C. Dhabolt, Jul. 1996.*

* cited by examiner

Primary Examiner—Yon J. Couso
(74) Attorney, Agent, or Firm—Trop, Pruner & Hu, P.C.

(57) ABSTRACT

A method for generating a printable report is disclosed. The method includes executing program instructions obtained from a host computer on a client computer remote from the host computer to generate reportable data; creating a report document including the reportable data on the client computer; and creating a virtual address corresponding to the location of the report on the client computer.

35 Claims, 3 Drawing Sheets

METHOD AND APPARATUS FOR GENERATING A REMOTE PRINTABLE REPORT

BACKGROUND OF THE INVENTION

1. Field of the Invention

The present invention relates generally to providing printable reports, and more particularly to providing a remote printable report from an otherwise unprintable source.

2. Description of Related Art

Distributed network systems such as the Internet, wide area networks, and local area networks typically connect one or more dissimilar computers. A browser application program, such as Internet Explorer® offered by Microsoft Corporation, may be used as an interface for communicating over the network system. Individual computers on the distributed network may be running different operating systems, may have different microprocessors, or may have other differing characteristics that make it difficult to share executable programs across platforms. To provide programming flexibility in distributed network environments, cross platform, non-platform-specific programming languages, such as Java, have been developed. Program code, either compiled or uncompiled, is transmitted from a host computer to a client computer. The browser may be programmed to receive and interpret the cross platform code.

Cross Platform Applet Programs

In the case of Java, an applet may be compiled from source code into bytecodes and stored on a host computer. When requested by a client computer, the applet is transferred to the client computer. The client computer includes an interpreter that interprets the bytecodes of the applet and executes the commands in accordance with the particular processor architecture and operating environment of the client computer. The interpreter may be incorporated into the browser used as the interface between the host and client computers.

For security reasons, cross platform programing languages are not allowed to issue printer commands on the client computer. If such applets were allowed to issue printer commands, a malicious applet could take control of the printer on the client side and print a large volume of unwanted information. The downside of this security limitation is that is difficult, if not impossible, to provide custom reporting functions based on interaction between the host and client computers using a cross platform language. Typically, when a browser attempts to print a document containing data from an applet, the report is blank.

Methods to Provide Reports from Applets

Methods for printing data from applets have been devised. One such method is to perform a screen print of the browser screen. A disadvantage of a print screen method is that the report would be limited to the information currently displayed in the browser. Custom reports based on requests from the user of the client computer would be nearly impossible to construct as the hyper text markup language ("HTML") document provided by the host computer would be required to display all possible combinations of requests from the client computer user for custom reports. Moreover, the manner in which data is displayed on a screen is typically different than the manner in which data is presented in a printed report.

Another option is to detect that the browser is printing, intercept the graphical bit map image being transmitted to the printer, and superimpose the desired information over the bitmap. A disadvantage of the intercepting method is that the size of the printout is limited by the size of the bitmap being sent to the printer by the browser. If a user has requested a report including tree pages of data, and the bitmap being printed was only two pages in length, the report would be limited to two pages. Again, this method has limited flexibility, and therefore a lesser degree of customization is available for the printed report.

A third option for providing a printable document is to create a static HTML document on the host computer and direct the client computer to the Uniform Resource Locator ("URL") of the static report. A URL is a physical address where a document or other resource is located on a network. While this method allows customization, it suffers from system accounting and security problems. While the static URL is present on the host computer, users at connected client computers other than the user requesting the information might be able to access the information, either intentionally or inadvertently. Such a static HTML document on the host computer is therefore unsecured. Also, the host computer might receive hundreds or thousands of requests for custom reports in a short time frame. The task of accounting for the multitude of static HTML documents, associating the static documents with the proper client computer user, and removing the static documents after a specified period of time would prove unwieldy and burdensome for the host computer. A host computer receiving many requests could conceivably exhaust its storage resources, and as a result, would not be able to continue providing custom reports.

Thus, there is a need for a more optimal method for providing a printable report from data generated by an application program inhibited from directly accessing a printer.

SUMMARY OF THE INVENTION

One embodiment of the invention is a method for generating a printable report. The method includes executing program instructions obtained from a host computer on a client computer remote from the host computer to generate reportable data; creating a report document including the reportable data on the client computer; and creating a virtual address corresponding to the location of the report on the client computer.

Figure 1:
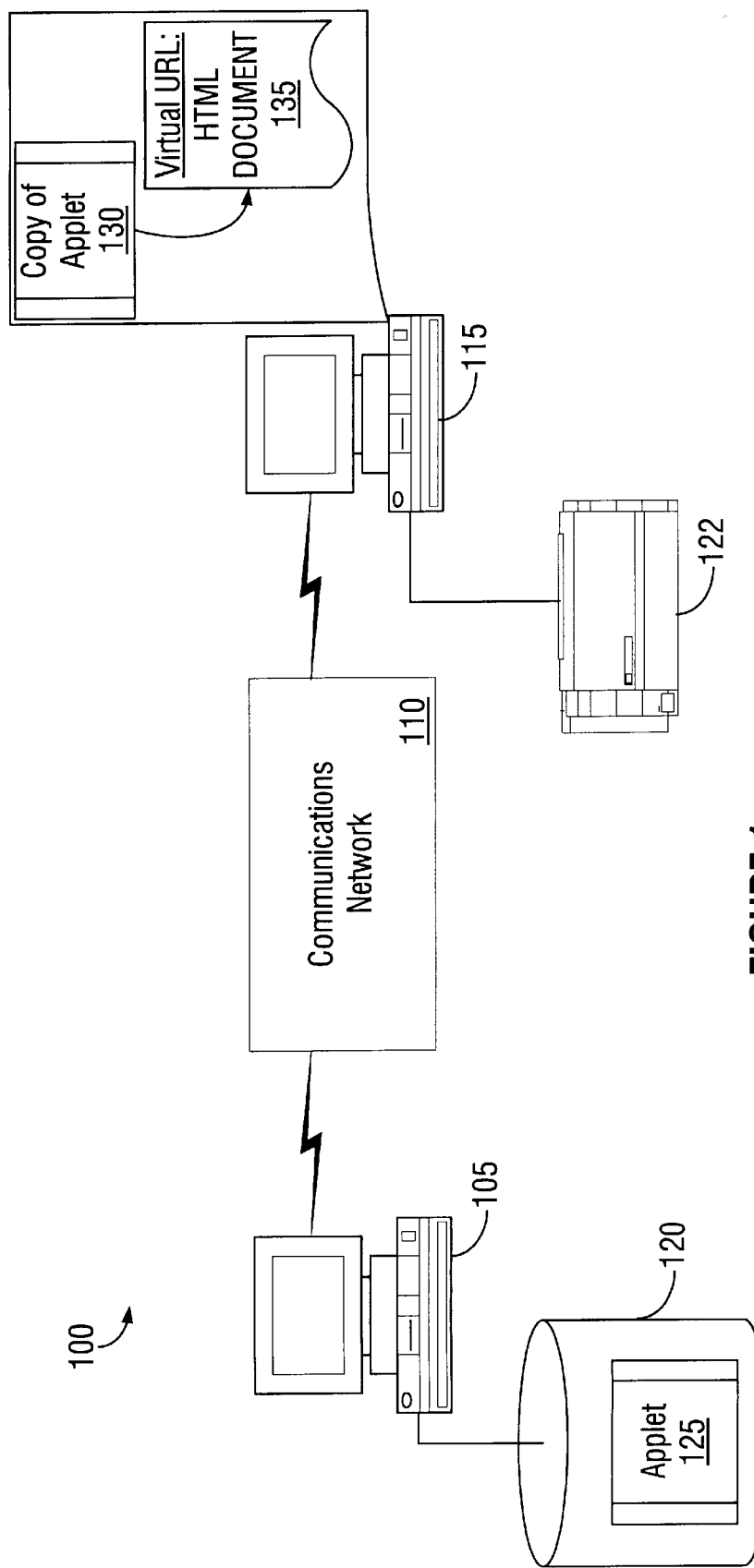
FIG. 1 illustrates a block diagram of a distributed network computer system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirt and scope of the invention as defined by the appended claims.

DETAILED DESCRIPTION OF THE INVENTION

The following examples are included to demonstrate preferred embodiments of the invention. It should be appreciated by those skilled in the art that the techniques disclosed in the examples that follow represent techniques discovered by the inventor to function well in the practice of the invention. However, those skilled in the art should, in light of the present disclosure, appreciate that many changes can be made in the specific embodiments disclosed herein without departing from the spirit and scope of the invention.

Some portions of the detailed descriptions below are presented in terms of a software implemented method and/or symbolic representations of operations on data bits within a computer memory. These descriptions and representations are the means used by those skilled in the art to most effectively convey the substance of their work to others skilled in the art. A software implemented method is here, and is generally, conceived to be a self-consistent sequence of acts leading to a desired result. The acts require at some level physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

However, all of these and similar terms are to be associated with the appropriate physical quantities and are merely convenient labels applied to these quantifies. Unless specifically stated or as may otherwise be apparent from the above discussions, terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Apparatus for Practicing the Invention

Referring to FIG. 1, a block diagram of a distributed network computing system 100 is provided. A host computer 105 is connected through a communications network 110 to at least one client computer 115. The communications network 110 may comprise the Internet, a wide or local area network, a modem based phone interconnection, or any other network suitable for transmitting data from the host computer 105 to the client computer 115. The host computer 105 includes a program storage device 120. The program storage device 120 may comprise a hard disk drive, a floppy disk drive, optical disk drive, memory device, or other suitable storage device. The program storage device 120 may be internal or external to the host computer 120. A printer 122 is attached to the client computer 115.

A FIRST EMBODIMENT OF THE INVENTION

Applet Transfer

In a typical distributed network system 100, data is exchanged between the host computer 105 and the client computer 115. One such method for exchanging information includes transferring an application program, or applet 125, from the host computer 105 to the client computer 115. The host computer 105 and the client computer 115 may be dissimilar in that they may have different operating systems, microprocessors, or other architectural differences that make an application program native to the platform of the host computer 105 incompatible with the platform of the client computer 115. Accordingly, a cross platform programming language such as Java may be used to provide an applet 125 stored in the program storage device 120 on the host computer 105 that can be transferred to and executed on the client computer 115. The applet copy 130 is received and executed by the client computer 115. For security reasons, applets are prohibited from issuing printer commands to the client computer 115.

Scripting Languages

The browser installed on the client computer 115 includes an interpreter that receives the compiled bytecodes of the applet copy 130 and interprets the bytecodes. Commands specific to the platform of the client computer 115 are issued to accomplish the programmed instructions of the applet 130. Cross platform scripting languages, such as JavaScript, have been developed to extend the capabilities of browsers. Scripting language commands are typically used to generate uncompiled application programs. In the case of JavaScript, the commands are issued to the same interpreter that interprets and acts on Java applet bytecodes. The applet copy 130 may issue a script command to the client computer 115. The script command is interpreted and executed by the browser.

Vitual URL

A script command may be issued by the applet copy 130 to the client computer 115 to generate a virtual URL 135 resident on the client computer 115. The command to create the virtal URL 135 requires an input string. The input string may include text, HTML commands, references to graphical images, etc. The HTML Document referenced by the virtual URL 135 includes data generated by the applet in a form that may be sent to the printer 122 associated with the client computer 115. Because the virtal URL 135 is present only on the client computer 115 that requested the report, there is no security risk of users of other client computers 115 intentionally or inadvertently accessing the report.

Figure 2:
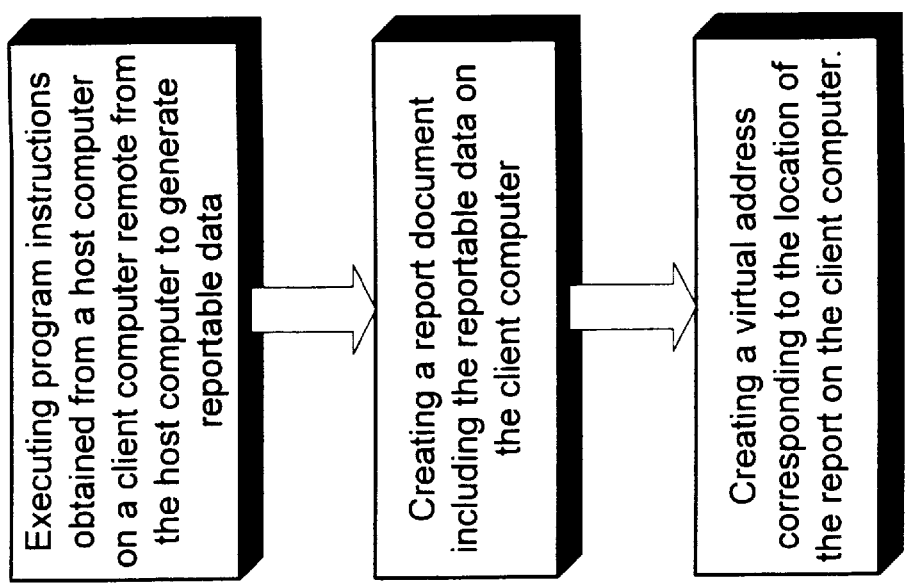
FIG. 2 illustrates one particular embodiment of a method practiced in accord with the present invention as may be implemented using the computer system of FIG. 1.

A method for generating a printable report practiced in accordance with the present invention as may be implemented with the computer system 100 of FIG. 1 is illustrated in FIG. 2. Referring now to both FIGS. 1 and 2, the method begins executing program instructions obtained from the host computer 105 on the client computer 115 remote from the host computer 115 to generate reportable data. The program instructions may be obtained from the host computer 105 by transferring the applet 125 to the client computer 115 and executing the applet copy 130 on the client computer 115. The client computer 115 then creates a report document including the reportable data. The report document in one particular embodiment is an HTML document such as the HTML document 135 in FIG. 1, although the invention is not so limited. Finally, the client computer 115 creates a virtual address corresponding to the location of the report from which the report may be printed. Again, in one particular embodiment the virtual address is a with URL although the invention is not so limited.

A SECOND EMBODIMENT OF THE INVENTION

Figure 3:
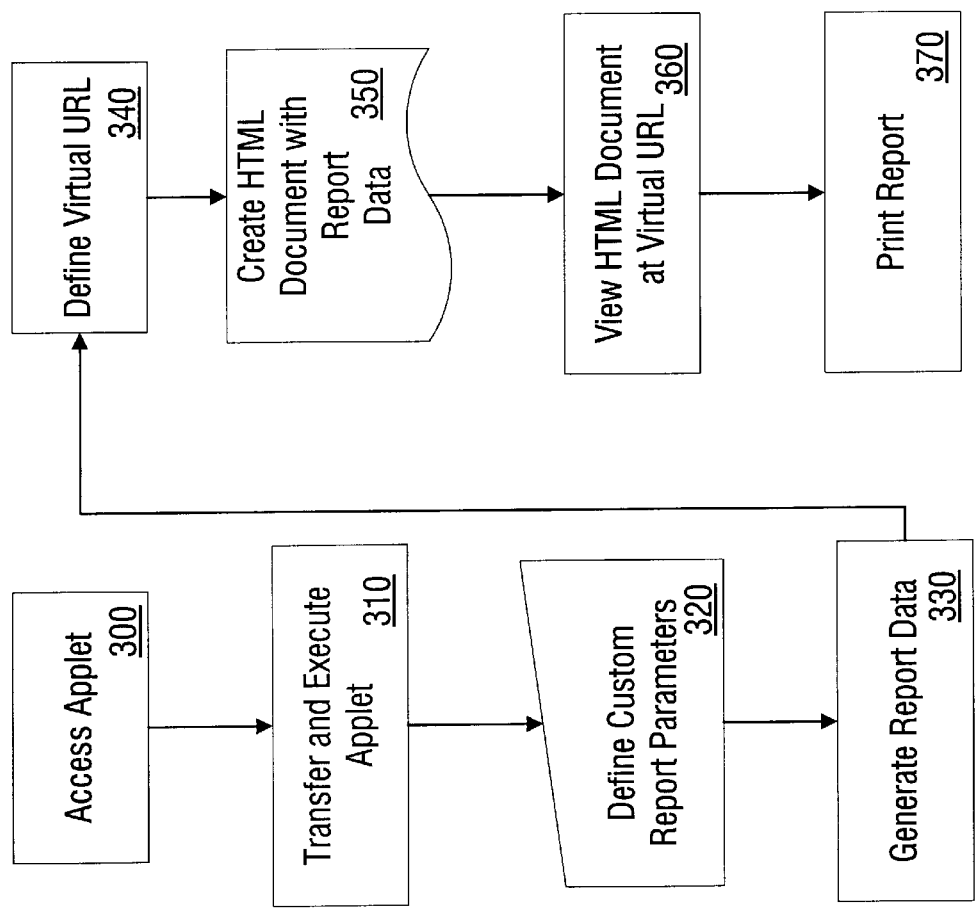
FIG. 3 illustrates a flow chart of a method for generating a printable report.

FIG. 3 is a flow chart for software implementing a method for generating a printable report using a scripting language such as the method of FIG. 2. In block 300 a user of a client computer 115 accesses an applet 125 stored on the host computer 105. The applet 125 is transferred to the client computer 115 and the applet copy 130 is executed by the client computer 115 in block 310. The user may interface with the host computer 105 to define custom report parameters as seen in block 320.

Based on the information provided by the user of the client computer 115, the applet 130 generates report data in block 330. The applet copy 130 may generate report data from internal variables, or the applet copy 130 may query the host computer 105 for additional information. In block 340, the applet copy 130 generates a virtal URL 135 on the client computer 115, such as may be accomplished by using a script command.

The report data is included in an HTML document created by the applet copy 130 as seen in block 350. The user may then view the HTML document at the virtual URL 135 as seen in block 360. In block 370, the report created at the virtual URL 135 may be printed.

REMARKS

The disclosed invention can be practiced in numerous different embodiments to provide users with simple and efficient methods of providing printable reports from an applet using a scripting language. The report generated by the method of FIG. 3 does not have the security or accounting problems associated with other methods to generate printed reports. Because the report exists at a virual URL 130 on the client machine 115, other users cannot intentionally or inadvertently access the information contained within the report. Also, because the report is resident on the client computer 115, the host computer 105 does not need to track the source of report requests or use storage space to hold generated reports.

Thus, the acts comprising the methods disclosed above are typically performed by a computer according to instructions encoded in some type of program storage device. The computer may be a specially programmed, general purpose computer or a particular computer dedicated to a particular task. Also, the instructions may be encoded on any type of computer readable medium acting as a program storage device. Typical program storage devices include, but are not limited to: random access memory ("RAM"), such as a floppy diskette, a hard disk, or a magnetic tape; read only memory ("ROM"), such as an optical disk; and variations thereon, such as a write once, read many ("WORM") disk. Still further, the methods may be performed on a computer program stored in an intermediate compiler language that may be utilized to perform other optimizations prior to translation to object code.

Those skilled in the art will now see that certain modifications can be made to the methods herein disclosed with respect to the illustrated embodiments, without departing from the spirit of the instant invention. And while the invention has been described above with respect to the preferred embodiments, it will be understood that the invention is adapted to numerous rearrangements, modifications, and alterations, and all such arrangements, modifications, and alterations are intended to be within the scope of the appended claims.

What is claimed is:

1. A method for generating a printable report, comprising:
   executing an application program obtained from a host computer on a client computer remote from the host computer to generate reportable data, the application program inhibited from issuing printer commands to the client computer;
   creating a report document including the reportable data on the client computer; and
   creating a virtual address corresponding to the location of the report on the client computer.

2. The method of claim 1, further comprising:
   accessing the virtual address to display the report document on the client computer.

3. The method of claim 2, further comprising:
   printing the report document.

4. The method of claim 1, wherein the creating a virtual address includes creating a virtual uniform resource locator related to the location of the report document.

5. The method of claim 1, wherein the creating a report document includes creating it hyper text markup language document including the reportable data.

6. The method of claim 1 wherein executing the application program includes:
   accessing an applet stored on the host computer;
   transferring a copy of the applet to the client computer; and
   executing the applet copy on the client computer.

7. The method of claim 6, wherein the creating a report document including the reportable data includes issuing a script command.

8. A general purpose computer programmed to implement a method for generating a printable report, the method comprising:
   receiving an applet from a host computer;
   executing the applet on the general purpose computer, the applet inhibited from issuing printer commands;
   generating reportable data;
   creating a report document including the reportable data; and
   creating a virtual address corresponding to the location of the report on the general purpose computer.

9. The computer of claim 8, the method further comprising:
   accessing the virtual address to display the report document on the general purpose computer.

10. The computer of claim 9, the method further comprising:
    printing the report document.

11. The computer of claim 8, wherein the creating a virtual address includes creating a virtual uniform resource locator related to the location of the report document.

12. The computer of claim 8, wherein the creating a report document includes creating a hyper text markup language document including the reportable data.

13. The computer of claim 8, wherein the creating a report document including the reportable data includes issuing a script command.

14. A program storage device encoded with instructions that, when executed by a computer, implement a method for generating a printable report, the method comprising:
    receiving an applet from a host computer;
    executing the applet on the computer, the applet prohibited from issuing printer commands to the computer;
    generating reportable data;
    creating a report document including the reportable data; and
    creating a virtual address corresponding to the location of the report on the computer.

15. The program storage device of claim 14, the method further comprising:
    accessing the virtal address to display the report document on the computer.

16. The program storage device of claim 15, the method further comprising:
    printing the report document.

17. The program storage device of claim 14, wherein the creating a virtual address includes creating a virtual uniform resource locator related to the location of the report document.

18. The program storage device of claim 14, wherein the creating a report document includes creating a hyper text markup language document including the reportable data.

19. The program storage device of claim 14, wherein the creating a report document including the reportable data includes issuing a script command.

20. A program storage device encoded with instructions that, when executed by a computer, perform a method for generating a printable report, the method comprising:

executing an application program inhibited from issuing printer commands, the application program obtained from a host computer on a client computer remote from the host computer to generate reportable data;

creating a report document including the reportable data on the client computer; and creating a virtual address corresponding to the location of the report on the client computer.

21. The program storage device of claim 20, wherein the method further comprises:

accessing the virtual address to display the report document on the client computer.

22. The program storage device of claim 21, wherein the method further comprises:

printing the report document.

23. The program storage device of claim 20, wherein the creating a virtual address in the method includes creating a virtual uniform resource locator related to the location of the report document.

24. The program storage device of claim 20, wherein the creating a report document in the method includes creating a hyper text markup language document including the reportable data.

25. The program storage device of claim 20 wherein executing the application program in the method includes:

accessing an applet stored on the host computer, the applet containing the program instructions;

transferring a copy of the applet to the client computer; and executing the program instructions of the applet copy on the client computer.

26. The program storage device of claim 25, wherein the creating a report document including the reportable data in the method includes issuing a script command.

27. The method of claim 1, further comprising accessing, from within the client computer, the report document using the virtual address, wherein the virtual address is present only in the client computer and inaccessible to devices outside the client computer.

28. The method of claim 27, wherein accessing the report document comprises accessing the report document using a virtual uniform resource locator, the virtual address comprising the virtual uniform resource locator.

29. The computer of claim 8, the method further comprising storing the virtual address in the computer, the virtual address inaccessible to devices outside the computer.

30. The program storage device of claim 14, the method further comprising providing access to the virtual address within the computer, wherein the virtual address is not accessible by devices outside the computer.

31. The program storage device of claim 20, wherein the method further comprises enabling access to the virtual address within the computer but not to devices outside the computer.

32. A system comprising:

an interface to receive an applet from a host computer, the applet being inhibited from issuing printer commands;

a processor adapted to execute the applet, the applet when executed by the processor:

creating a document containing data; and generating a virtual address associated with the document.

33. The system of claim 32, wherein the virtual address comprises a virtual uniform resource locator.

34. The system of claim 32, wherein the virtual address is accessible within the system but not accessible by devices outside the system.

35. The system of claim 32, wherein the processor is adapted to further execute a routine to print the document by accessing the virtual address.

* * * * *